DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 9

T904,016

LAMINAR ARTICLE WITH FUSED INTERFACE

William Bauer, Jr., 2046 Winthrop Road, Huntingdon Valley, Pa. 19006, and Newman M. Bortnick, 509 Oreland Mill Road, Oreland, Pa. 19075

Filed Apr. 17, 1972, Ser. No. 244,846

Int. Cl. A47g *5/02*

U.S. Cl. 161—254

No Drawing. 8 Pages Specification

One or two non-tacky film(s) or sheet(s) of the same or different composition formed of a polymer of one or more monoethylenically unsaturated monomers, such as of homopolymers or copolymers of vinyl chloride, butyl methacrylate, or other acrylic acid ester or methacrylic acid ester, e.g. a multistage polymer of U.S. patent 3,562,-235 (especially the butyl acrylate, 1,3-butylene glycol diacrylate, methyl methacrylate, methacrylic acid copolymer of Ex. 1 therein) is or are continuously fed to the nip between two moving stainless steel belts, on one or both sides of a monomer/polymer sirup also being fed into the nip for polymerization thereof during travel of the film(s) and sirup between the belts, such as in equipment disclosed in U.S. Patent 3,376,371, to form a two-ply or three-ply laminate.

The sirup may be composed of a solution of polymethyl methacrylate, or of a copolymer of at least 50% methyl methacrylate with at least another monomer, such as styrene, acrylonitrile, vinyl acetate, or a ($C_1$–$C_8$)alkyl ester of acrylic acid or of methacrylic acid, in methyl methacrylate or in a mixture thereof with at least another of the monomers mentioned.